(12) United States Patent
Meier et al.

(10) Patent No.: US 8,157,548 B2
(45) Date of Patent: Apr. 17, 2012

(54) SUPPLY PUMP, IN PARTICULAR FOR SUPPLYING DIESEL FUEL, WITH IMPROVED BEARING OF THE DRIVE SHAFT

(75) Inventors: Gerhard Meier, Schorndorf (DE); Johannes Muellers, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 414 days.

(21) Appl. No.: 12/447,933

(22) PCT Filed: Sep. 17, 2007

(86) PCT No.: PCT/EP2007/059768
§ 371 (c)(1),
(2), (4) Date: Apr. 30, 2009

(87) PCT Pub. No.: WO2008/052842
PCT Pub. Date: May 8, 2008

(65) Prior Publication Data
US 2010/0068079 A1    Mar. 18, 2010

(30) Foreign Application Priority Data
Oct. 31, 2006  (DE) .......................... 10 2006 051 332

(51) Int. Cl.
*F04B 7/04* (2006.01)
*F04B 39/10* (2006.01)

(52) U.S. Cl. ........................... 417/490; 417/70; 417/501

(58) Field of Classification Search .................. 417/490, 417/70, 501, 20, 92, 417
See application file for complete search history.

(56) References Cited

U.S. PATENT DOCUMENTS
5,640,935 A    6/1997   Ishihara

FOREIGN PATENT DOCUMENTS
| DE | 102004028127 A1 | 1/2005 |
| DE | 102005006038 A1 | 8/2006 |
| JP | 2003193938 A | 7/2003 |
| JP | 20052869 A | 1/2005 |

*Primary Examiner* — Joseph L Williams
(74) *Attorney, Agent, or Firm* — Ronald E. Greigg

(57) ABSTRACT

The present invention relates to a delivery pump, in particular for delivering diesel fuel into a high-pressure accumulator. The pump has a housing and a drive shaft which is accommodated in the latter and is mounted by at least one sliding bearing arrangement such that it can rotate about a drive shaft axis. The sliding bearing arrangement is formed by a bearing bore and a bearing shaft section which extends through the latter. The sliding bearing arrangement has a bearing play which extends in the radial direction between the bearing shaft section and the bearing bore and has a smaller value in the bearing center than at least one bearing edge. A delivery pump for delivering diesel fuel is therefore provided which has a low-wear sliding bearing arrangement.

20 Claims, 3 Drawing Sheets

SUPPLY PUMP, IN PARTICULAR FOR SUPPLYING DIESEL FUEL, WITH IMPROVED BEARING OF THE DRIVE SHAFT

CROSS-REFERENCE TO RELATED APPLICATION

This application is a 35 USC 371 application of PCT/EP 2007/059768 filed on Sep. 17, 2007.

BACKGROUND OF THE INVENTION

1. Field of the Invention

The present invention relates to a supply pump for supplying diesel fuel. In particular, the present invention is directed to an improved embodiment of the slide bearing arrangement for bearing the drive shaft in the housing of the supply pump.

2. Description of the Prior Art

One generic supply pump for supplying diesel fuel is known from German Published Patent Application DE 101 38 362 A1. The supply pump serves to supply diesel fuel to a so-called common rail fuel injection system. The so-called common rail forms a high-pressure reservoir, whose high pressure is maintained by means of the supply pump. The supply pump has a housing, with a drive shaft received in it that is supported rotatably about a drive shaft axis by means of two slide bearing arrangements. The slide bearing arrangement is formed by a bearing bore and by a bearing shaft portion that extends through the bearing bore. The bearing shaft portion forms a part of the drive shaft, and the bearing arrangements are preferably disposed adjacent to a cam portion, over which a roller rolls, and thus is operatively connected to a valve combination. The slide bearing arrangement includes one bearing bush each, in which the bearing bore is embodied.

A further embodiment of a supply pump of this generic type is disclosed in German Published Patent Disclosure DE 199 13 804 A1. The supply pump serves to supply fuel to a high-pressure reservoir for an internal combustion engine, and the supply pump is embodied with two pump chambers that are in line with one another. The valve combinations in this version are actuated via two cam drive mechanisms, disposed adjacent one another on a drive shaft, and the cam drive mechanisms are received on the drive shaft between two slide bearing arrangements. Thus an advantageous load situation develops between the bearing arrangements.

With a view to generating the reciprocation of the reciprocating element extending into the valve combination, the supply pump can be embodied with a cam drive mechanism or with an eccentric drive mechanism. However, in both types of such supply pumps, the problem arises that because of the very high supply pressures, strong forces act on the drive shaft and have to be absorbed by the slide bearing arrangements. These forces are introduced into the drive shaft via the pressure rollers onto the cam portions and are due to the respective valve combinations. In addition, major shear forces can be introduced into the drive shaft, caused by units that are likewise driven via the drive shafts. The drive shaft extends out of the housing of the supply pump in at least one direction, and it receives at least one transmission mechanism for transmitting power by means of a traction mechanism, toothing, or the like. If, for the sake of power throughput, additional units are driven via the drive shaft of the supply pump, then considerable forces may be introduced into the drive shaft and must likewise be absorbed by the respective slide bearing arrangement. Resultant sagging of the drive shaft leads to edge supports in the bearing edges, which cause very strong edge pressures between the bearing shaft portion and the bearing bore. The high values of the bearing pressures can have the effect that a load-bearing film of lubricant between the bearing bore and the bearing shaft portion can no longer develop, which can lead to considerable wear and premature failure of the supply pump. Conventional bearing arrangements in the prior art have a cylindrical embodiment, so that the bearing shaft portion and the bearing bore each form a concentric cylindrical portion.

Slide bearings have a typical bearing clearance, which forms as a difference in diameter in the radial direction between the bearing shaft portion and the bearing bore. A bearing clearance of this kind is provided in order to form hydrodynamic lubrication by means of a lubricant, such as lubricating grease or lubricating oil. If the drive shaft tilts slightly, either from a skewed position, that is, a skewed course through the two slide bearing arrangements, or from sagging of the drive shaft, the result is an incorrect position geometrically; that is, the alignment of the bearing bore no longer matches the alignment of the bearing shaft portion.

OBJECT AND SUMMARY OF THE INVENTION

It is therefore the object of the present invention to create a supply pump for supplying diesel fuel that has a low-wear slide bearing arrangement.

The invention includes the technical teaching that the slide bearing arrangement includes a bearing clearance which extends between the bearing shaft portion and the bearing bore, and which has a lower value in the bearing center than at at least one bearing edge.

The invention proceeds from the thought that the maximum pressures per unit of surface area between the bearing bore and the bearing shaft portion can be reduced in the region of the bearing edge. If the alignment of the bearing bore no longer matches the alignment of the bearing shaft portion, then the increased bearing clearance can compensate for the angular error in the region of the bearing edges. Thus the slide bearing arrangement develops a symmetry, and the bearing center forms the plane of symmetry. Because of the increased bearing clearance at the bearing edge, the slide bearing arrangement can compensate on the order of a ball joint for very slight angular ranges of errors of alignment, without requiring a corresponding resilience in the bearing bore or in the bearing shaft portion. Tests have shown that the pressure per unit of surface area can be reduced by approximately 20 to 25%. It is thus a considerable advantage of the slide bearing arrangement of the invention for a supply pump to compensate for errors of alignment, sagging, and other discontinuities in the drive shaft without requiring access to an expensive pendulum bearing arrangement embodied as a roller bearing.

With regard to the design of the supply pump, the bearing arrangement of the invention extends to both types of supply pumps, so that the supply pump can include a cam drive mechanism or an eccentric drive mechanism, in order to drive a reciprocating element, extending into at least one valve combination, in reciprocating fashion. In a supply pump of a known eccentric type, valve combinations arranged in a star pattern may be provided, into each of which one reciprocating element extends, and the reciprocating elements are operatively connected to an eccentric disk. However, the forces acting on the bearing arrangement of the invention are equally present, regardless of the type of supply pump, whether it has a cam drive mechanism or an eccentric drive mechanism, so that the bearing arrangement in the embodiment proposed is usable and intended for both types.

A further advantageous embodiment of the present invention provides that the bearing bore has a cylindrical shape, and the bearing shaft portion has a spherical shape, so that the latter is embodied symmetrically in the direction of the drive shaft axis. The spherical shape is formed by a radial contour that extends from the first bearing edge to the second bearing edge. The sphericality is thus a kind of thickening with a maximum thickness at the bearing center, so that at the bearing center, the bearing clearance is minimal. At the bearing edges, conversely, the bearing clearance is maximal. The transitions from the spherical portion to the cylindrical drive shaft at the level of the respective bearing edges can include compensatory radii for preventing edge formation.

In a further embodiment of the slide bearing arrangement, it can be provided that the bearing shaft portion, in the region of the bearing center, has a cylindrical portion, which is adjoined on both sides in the direction of the drive shaft axis by a spherical portion. The cylindrical portion changes over, via respective transitional radii, to the spherical portion, and the spherical portion in turn, by means of a respective transitional radius, changes over to the cylindrical part of the adjoining drive shaft. If there is an angular error between the alignment of the bearing bore and the alignment of the bearing shaft portion, the load-bearing region can deviate from the cylindrical portion embodied in the region of the bearing center and migrate along the spherical portion. The pressure per unit of surface area between the bearing bore and the bearing shaft portion is increased only insignificantly at the point or area of contact. The spherical portion has a radius, and the transition between the cylindrical portion and the spherical portion is embodied without edges.

In still another embodiment of the invention, the cylindrical portion is adjoined to both sides in the direction of the drive shaft axis by a conical portion. Instead of a spherical portion, the region embodied between the cylindrical portion and the bearing edges can also be provided in the form of a conical portion. The transition between the conical portion and the cylindrical portion can again have transitional radii, in order to smooth the edges created between the portions.

For structural reasons, it can be especially advantageous that the bearing shaft portion is embodied cylindrically and corresponds to a conventional slide bearing arrangement. The increased bearing clearance in the peripheral region of the bearing is attained by providing that the bearing bore itself have a curvature, and the bearing bore has a smaller diameter at the bearing center than at the bearing edges. In this structural embodiment of the slide bearing arrangement with a sphericality in the bearing bore, errors of alignment can be compensated for in the same way. In the event of a skewed position of the alignment of the bearing shaft portion relative to the alignment of the bearing bore, edge supports are avoided in this exemplary embodiment as well, because the diameter of the bearing bore is designed to be greater in the region of the bearing edge than in the region of the bearing center.

Advantageously, in the region of the bearing center, the bearing clearance has a value of 1 µm to 150 µm, preferably from 10 µm to 50 µm, and especially preferably, 40 µm. Analogously, it can be provided that the difference in diameter of the bearing shaft portion between the bearing center and the bearing edges encompasses a value from 1 µm to 150 µm, preferably from 10 µm to 50 µm, and especially preferably from 20 µm to 30 µm. For instance, the bearing play can be 40 µm, which happens if both the bearing bore and the bearing shaft portion are embodied cylindrically. If the bearing clearance in the region of the bearing edges is increased to 60 µm, for instance, a reduction in the pressure per unit of surface area between the bearing shaft portion and the bearing bore from 90 MPa to approximately 70 MPa is attainable.

In a further advantageous embodiment of the invention, the at least one slide bearing arrangement includes a bearing bush, and the bearing bore is embodied in the bearing bush. The bearing bush is received either in the housing of the supply pump or in a bearing flange that is in turn connected to the housing. The bearing bush is press-fitted, glued or in some other way connected axially fixedly and torsionally fixedly into the housing or the bearing flange. As the slide bearing material, the bearing bush can include an aluminum material, a bronze material, or a plastic material such as PEEK or PPS (polyetheretherketone or polyphenyl sulfide). By means of these materials, an optimal frictional pairing is formed between a drive shaft, preferably made of steel, and the bearing bush. The lubrication of the bearings can be effected either by means of a lubricating oil, by permanent lubrication through a filling of grease, or by the diesel fuel itself.

Advantageously, the drive shaft includes a cam drive mechanism or an eccentric drive mechanism, and adjacent to each is a slide bearing arrangement. Since the forces are introduced into the cam portion or the eccentric portion, a slide bearing arrangement that adjoins the cam portion directly is especially advantageous. Thus the forces introduced into the cam portion or eccentric portion can be absorbed optimally by the slide bearing arrangement, and sagging of the drive shaft is minimized.

BRIEF DESCRIPTION OF THE DRAWINGS

Further provisions that improve the invention will be described in further detail below along with the description of a preferred exemplary embodiment of the invention, in conjunction with the drawings, in which.

DESCRIPTION OF THE PREFERRED EMBODIMENTS

Figure 1:
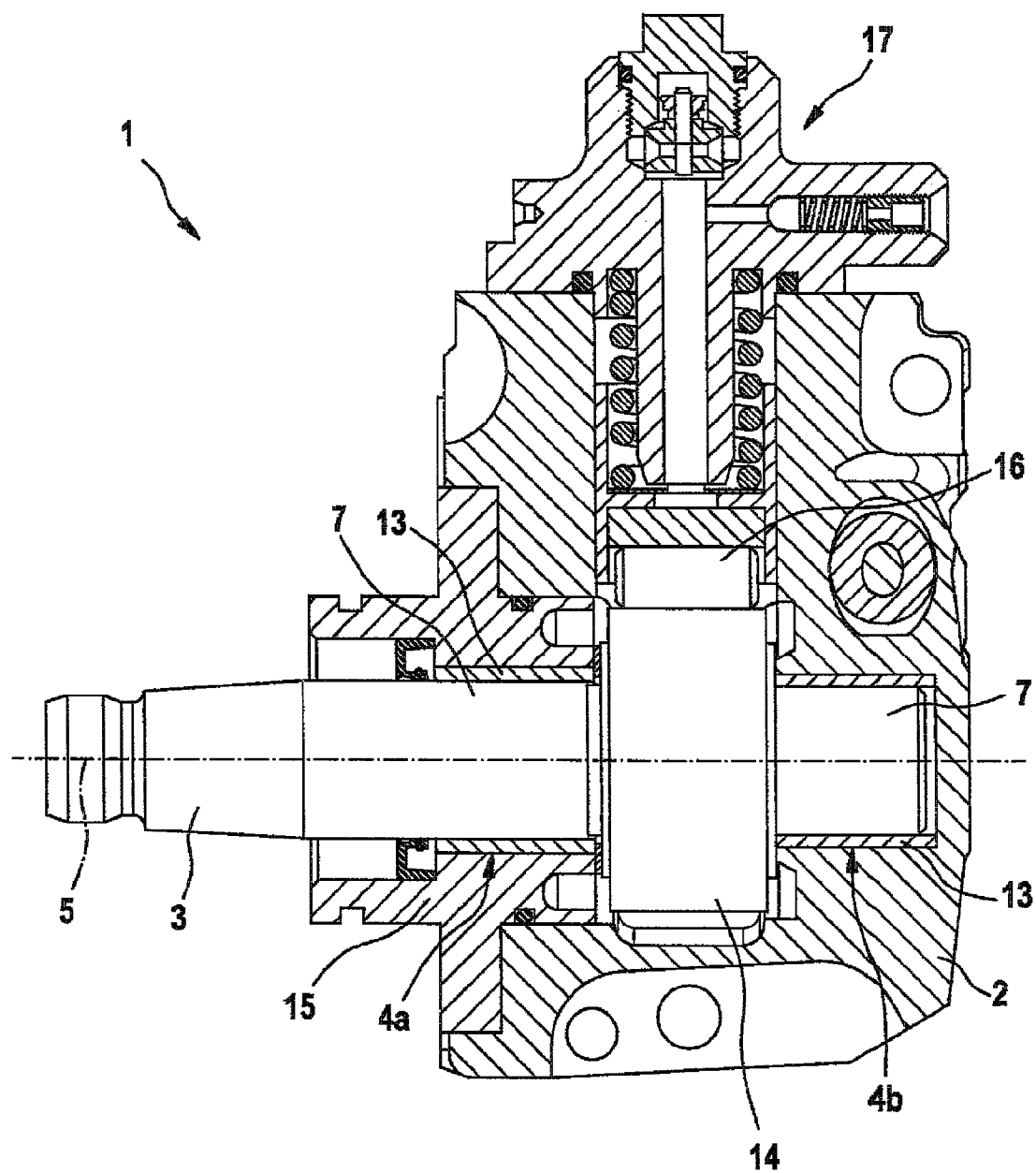
FIG. 1, a cross-sectional side view of a supply pump, embodied for instance with a cam drive mechanism, for supplying diesel fuel, which pump includes a drive shaft that is rotatably received in two slide bearing arrangements.

FIG. 1 shows a supply pump 1 in a cross-sectional side view. It serves to supply diesel fuel to a high-pressure reservoir. The supply pump 1 includes a housing 2, in which a drive shaft 3 is received in a rotatably supported manner. The drive shaft 3 extends along a drive shaft axis 5 and is supported in two slide bearing arrangements 4a and 4b. The slide bearing arrangement 4a is received in a bearing flange 15, while the slide bearing arrangement 4b is placed directly in the housing 2. The slide bearing arrangements 4a and 4b are each formed by a respective bearing bush 13, which receives the drive shaft 3 via bearing shaft portions 7. Between the two slide bearing arrangements 4a and 4b, the drive shaft 3 includes a cam drive mechanism 14. A pressure roller 16 rolls along the cam portion 14, so that by the rotation of the drive shaft 3, a stroke limitation in a valve combination 17 is created. Forces that occur are introduced preferentially via the pressure roller 16 into the cam portion 14 and are absorbed by the adjacent slide bearing arrangements 4a and 4b. Moreover, forces can be introduced via the region of the drive shaft 3 that protrudes out of the housing 2, and these forces are absorbed primarily by the slide bearing arrangement 4a.

Figure 2:
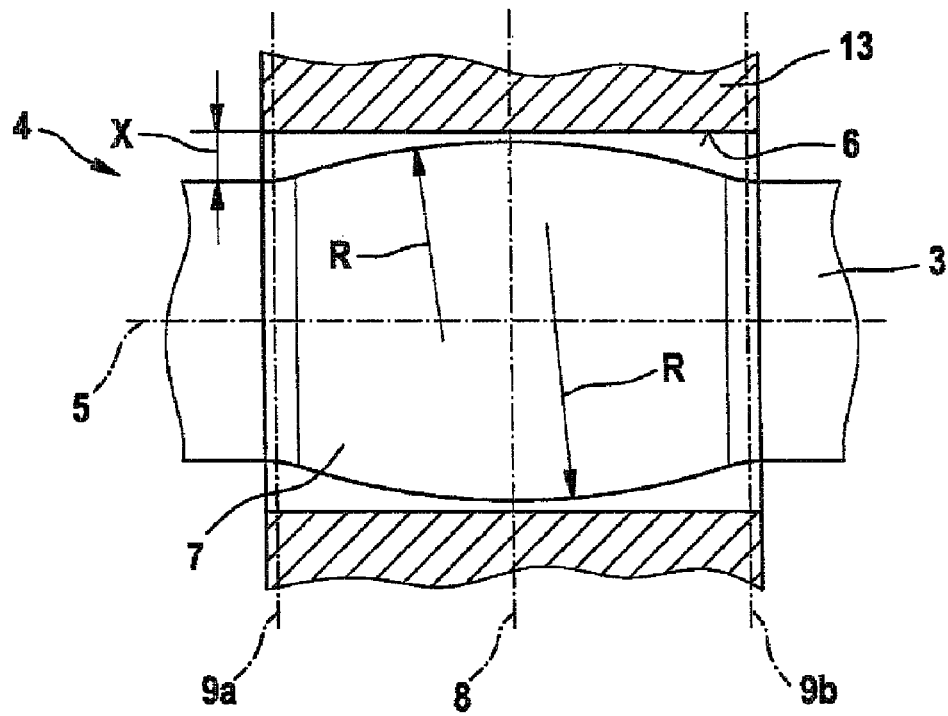
FIG. 2, a first exemplary embodiment of a slide bearing arrangement for a supply pump in accordance with the present invention.

FIG. 2 shows a first exemplary embodiment of a geometric embodiment of a slide bearing arrangement 4 according to the present invention. What is shown is the drive shaft 3, which extends through the bearing bush 13. The region of the drive shaft 3 that forms the slide bearing arrangement 4 is formed by the bearing shaft portion 7. This portion extends through the bearing bore 6 inside the bearing bush 13. The bearing bore 6 is embodied cylindrically, while conversely the bearing shaft portion 7 includes a spherical portion, which is indicated by the radius R. The diameter of the drive shaft 3 is less than the diameter of the bearing bore 6. The spherical portion that forms the bearing shaft portion 7 extends from the bearing edge 9a to the bearing edge 9b. The bearing edges 9a and 9b are indicated by a dot-dashed line, and located between the bearing edges 9a and 9b is the bearing center 8, which is likewise indicated by a dot-dashed line. The axis of rotation of the drive shaft 3 is indicated by the drive shaft axis 5, which in its alignment matches the alignment of the bearing bore 6 as shown in FIG. 1. If the alignment of the drive shaft axis 5 then differs from the alignment of the bearing bore 6, then the load-bearing region of the spherically embodied bearing shaft portion 7 migrates from the bearing center 8 and approaches one bearing edge, 9a or 9b. By means of the design according to the invention of the slide bearing arrangement 4, high pressures between the bearing bore 6 and the bearing shaft portion 7 are avoided, so that wear to the slide bearing arrangement 4 is minimal.

Figure 3:
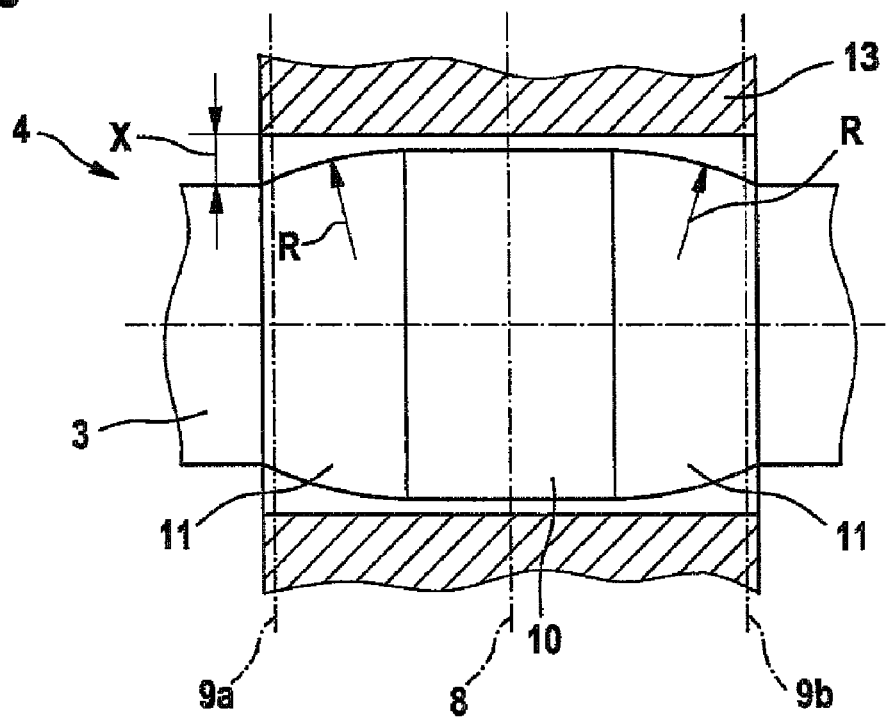
FIG. 3, a second exemplary embodiment of a slide bearing arrangement for a supply pump in accordance with the present invention.

FIG. 3 shows a further exemplary embodiment of the geometrical design of the slide bearing arrangement 4. The bearing shaft portion of the drive shaft 3 is subdivided into a cylindrical portion 10, adjoined to the left and right by a respective spherical portion 11 that merges with the drive shaft 3. The cylindrical portion 10 has a larger diameter than the drive shaft 3, and by means of the respective adjoining spherical portions 11, the transition is made from the larger diameter of the cylindrical portion 10 to the smaller diameter of the drive shaft 3. The radii of the spherical portions 11 are represented by an arrow and a letter R. Thus edge formation between the cylindrical portion 10 and the respective spherical portion 11 is avoidable, since the cylindrical portion 10 merges directly with the spherical portion.

Figure 4:
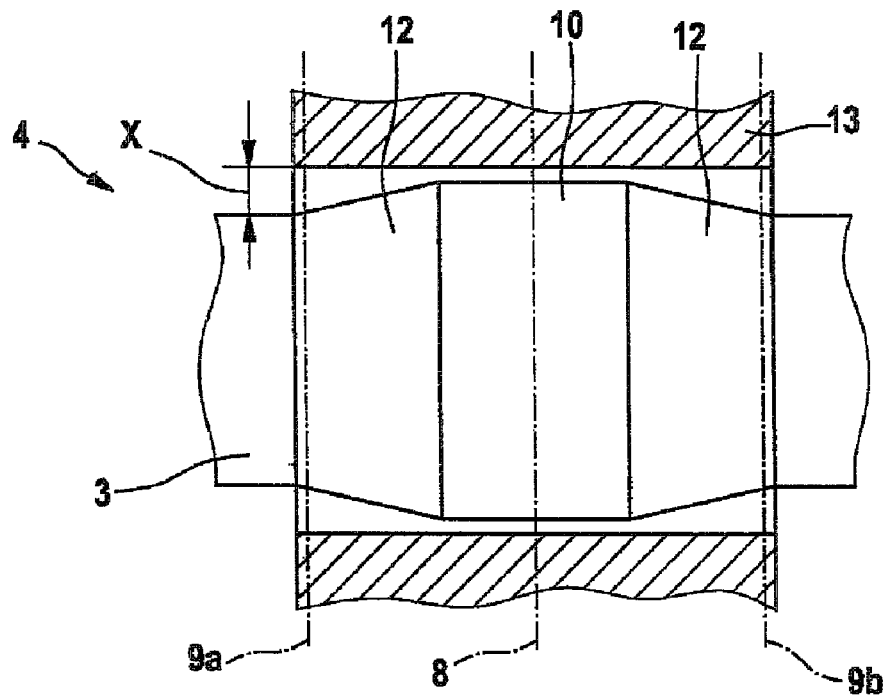
FIG. 4, a third exemplary embodiment of a slide bearing arrangement for a supply pump in accordance with the present invention.

In FIG. 4, a further exemplary embodiment of a slide bearing arrangement 4 is shown, in which the bearing shaft portion is again formed by a cylindrical portion 10, which is adjoined to both the left and the right by a conical portion 12. In this exemplary embodiment as well, the cylindrical portion 10 has a larger diameter than the drive shaft 3, and the transition is formed by the respective conical portions 12. To minimize edge forming between the cylindrical portion 10 and the conical portions 12, these portions can be smoothed by means of an edge radius.

Figure 5:
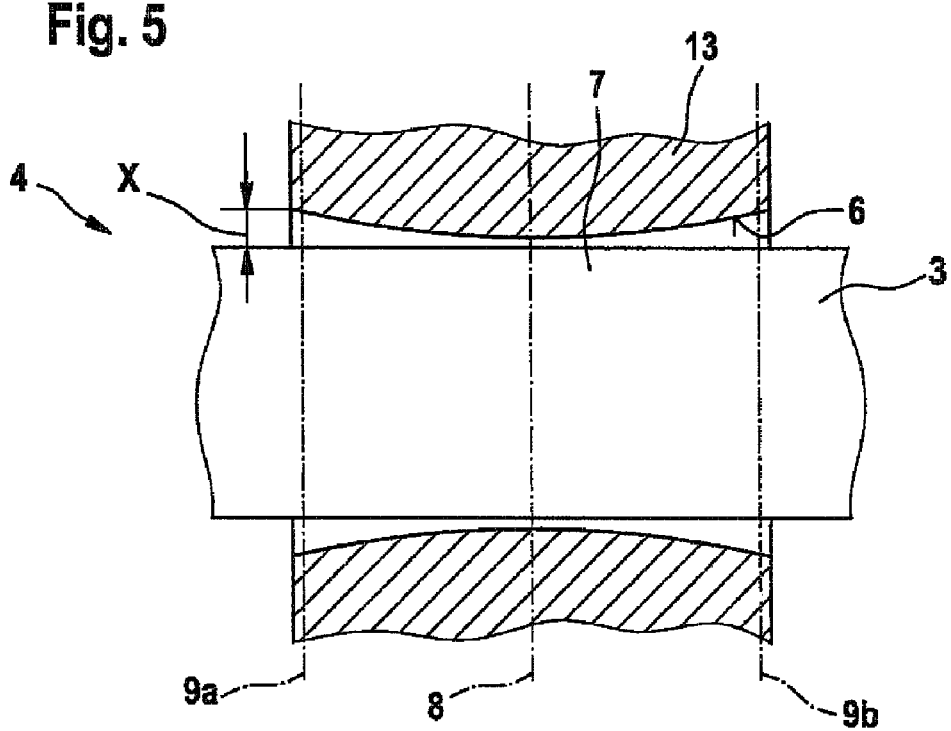
FIG. 5, a fourth exemplary embodiment of a slide bearing arrangement for a supply pump in accordance with the present invention.

FIG. 5 shows a further possible slide bearing arrangement 4, which initially has a cylindrical bearing shaft portion 7. The drive shaft 3 merges evenly, or in other words with an invariable cross section, with the bearing shaft portion 7. The spherical contour for creating a bearing clearance, which is less in the bearing center 8 than at the respective bearing edges 9a and 9b, the bearing bush 13 is embodied with a spherical bearing bore 6. The bearing bore 6 has a larger diameter in the region of the bearing edges 9a and 9b than in the region of the bearing center 8. In accordance with what is shown in FIG. 5, the transition from the smaller to the larger diameter of the bearing bore 6 is embodied parabolically, and the respective transitions can also have an embodiment which is made analogous to the stepped contour of the bearing shaft portions 7 of FIGS. 2 through 4.

The invention in its embodiment is not limited to the preferred exemplary embodiment described above. On the contrary, a number of variants are conceivable that make use of the solution shown, even in embodiments of fundamentally different types. In particular, the proposed embodiment of the slide bearing arrangement does not extend to the cam drive mechanism shown as an example in the drawings; instead, the scope of the present invention likewise extends to supply pumps of the eccentric pump or crank drive pump type.

The invention claimed is:

1. A supply pump, in particular for supplying diesel fuel to a high-pressure reservoir, comprising:
   a housing;
   a drive shaft supported rotatably in the housing about a drive shaft axis;
   at least one slide bearing arrangement rotatably supporting the drive shaft about the axis, the slide bearing arrangement being formed by a bearing bore and a bearing shaft portion extending through the bearing bore, wherein the slide bearing arrangement includes a bearing clearance which extends between the bearing shaft portion and the bearing bore, and which has a lower value in a center of the bearing that at at least one bearing edge.

2. The supply pump as defined by claim 1, wherein the supply pump includes a cam drive mechanism, for driving a reciprocating element, which extends into at least one valve combination, in reciprocal motion.

3. The supply pump as defined by claim 2, wherein the bearing bore has a cylindrical shape, and the bearing shaft portion has a spherical shape, and the slide bearing arrangement is embodied symmetrically about the bearing center in a direction of the drive shaft axis.

4. The supply pump as defined by claim 2, wherein the bearing shaft portion, in a region of the bearing center, has a cylindrical portion, which is adjoined on both sides in a direction of the drive shaft axis by a spherical portion.

5. The supply pump as defined by claim 4, wherein the cylindrical portion is adjoined to both sides in the direction of the drive shaft axis by a conical portion.

6. The supply pump as defined by claim 2, wherein the bearing shaft portion is embodied cylindrically, and the bearing bore has a curvature, so that the bearing bore has a smaller diameter in the bearing center than at the bearing edge.

7. The supply pump as defined by claim 1, wherein the supply pump includes an eccentric drive mechanism, for driving a reciprocating element, which extends into at least one valve combination, in reciprocal motion.

8. The supply pump as defined by claim 7, wherein the bearing bore has a cylindrical shape, and the bearing shaft portion has a spherical shape, and the slide bearing arrangement is embodied symmetrically about the bearing center in a direction of the drive shaft axis.

9. The supply pump as defined by claim 8, wherein the bearing shaft portion, in a region of the bearing center, has a cylindrical portion, which is adjoined on both sides in a direction of the drive shaft axis by a spherical portion.

10. The supply pump as defined by claim 9, wherein the cylindrical portion is adjoined to both sides in the direction of the drive shaft axis by a conical portion.

11. The supply pump as defined by claim 8, wherein the bearing shaft portion is embodied cylindrically, and the bearing bore has a curvature, so that the bearing bore has a smaller diameter in the bearing center than at the bearing edge.

12. The supply pump as defined by claim 1, wherein the bearing bore has a cylindrical shape, and the bearing shaft portion has a spherical shape, and the slide bearing arrangement is embodied symmetrically about the bearing center in a direction of the drive shaft axis.

13. The supply pump as defined by claim 1, wherein the bearing shaft portion, in a region of the bearing center, has a cylindrical portion, which is adjoined on both sides in a direction of the drive shaft axis by a spherical portion.

14. The supply pump as defined by claim 13, wherein the cylindrical portion is adjoined to both sides in the direction of the drive shaft axis by a conical portion.

15. The supply pump as defined by claim 1, wherein the bearing shaft portion is embodied cylindrically, and the bearing bore has a curvature, so that the bearing bore has a smaller diameter in the bearing center than at the bearing edge.

16. The supply pump as defined by claim 1, wherein in the region of the bearing center, the bearing clearance has a value of 10 µm to 50 µm.

17. The supply pump as defined by claim 1, wherein a difference in diameter of the bearing shaft portion between the bearing center and the bearing edges encompasses a value 20 µm to 30 µm.

18. The supply pump as defined by claim 1, wherein the at least one slide bearing arrangement includes a bearing bush, and the bearing bore is embodied in the bearing bush.

19. The supply pump as defined by claim 18, wherein the bearing bush is made from a slide bearing material, including an aluminum material, a bronze material, or a plastic material such as PEEK or PPS.

20. The supply pump as defined by claim 1, wherein the drive shaft includes at least one cam portion and/or at least one eccentric portion, totaling at least two of said portions, and adjacent to said at least two portions, one slide bearing arrangement is provided for each.

* * * * *